Oct. 3, 1967                P. L. BOURGAULT ETAL                3,345,545
              SOLID ELECTROLYTIC CAPACITOR HAVING MINIMUM ANODE IMPEDANCE
Filed Nov. 27, 1964
                                                            4 Sheets-Sheet 1

INVENTOR.
PIERRE L. BOURGAULT
BY JOOST BATELAAN

ATTORNEY

United States Patent Office 3,345,545
Patented Oct. 3, 1967

3,345,545
SOLID ELECTROLYTIC CAPACITOR HAVING MINIMUM ANODE IMPEDANCE
Pierre L. Bourgault, Etobicoke, Ontario, and Joost Batelaan, Toronto, Ontario, Canada, assignors to Johnson, Matthey and Mallory, Ltd., Toronto, Ontario, Canada, a corporation of Canada
Filed Nov. 27, 1964, Ser. No. 414,216
10 Claims. (Cl. 317—230)

ABSTRACT OF THE DISCLOSURE

In an electrolytic capacitor a film forming metal anode having at least one channel formed therein reducing the quantity of metal in the anode so as to reduce the impedance thereof by an amount greater than the increase in the impedance due to the absence of the anode metal due to the presence of the channels.

---

The present invention relates to an electrical capacitor of the electrolytic type in which a film forming metal, more particularly a porous, sintered anode of tantalum of particular geometrical shape is utilized to provide substantially improved alternating current characteristics in the audio frequency range.

Despite the relatively high dissipation factor which the slug type tantalum capacitor exhibits in the audio frequency region it is quite widely used in electronic circuits operating in this frequency region. Any substantial reduction in dissipation factor of the tantalum capacitor would result in an improvement of its performance in the audio frequency range and moreover would expand the range of the capacitor's applicability. Some of the benefits to be derived from an improved dissipation factor are: (1) a lower impedance at high frequency for a given capacitor size; (2) less powder dissipation in the component; and (3) an electrical behavior which would resemble more closely that of an ideal capacitor.

In addition, it is known that the alternating current characteristics of a tantalum capacitor are influenced by the temperature at which the capacitor is operated. The effect is greater for capacitors empolying "wet" electrolyte but the effect also can be quite substantial for capacitors employing a solid semiconducting electrolyte such as $MnO_2$. Generally, it is found that conventional solid tantalum capacitors, of high capacitance ratings, have high dissipation factors at frequencies above about 1 kilocycle. By way of illustration, it is found that a 330 microfarad solid tantalum capacitor at 25 degrees centigrade has a dissipation factor of approximately 0.30 at a frequency of 1 kilocycle whereas the dissipation factor is approximately 0.75 at a frequency of 3 kilocycles. Moreover, the stability of capacitance with varying temperature is normally not as good if the measuring frequency is 1 kilocycle or more rather than the more commonly used frequency of 120 cycles per second. Another factor worthy of note is the variation of capacitance with applied frequency. In several of the solid tantalum capacitors it is found that beyond a certain frequency the capacitance of the capacitor decreases rapidly with an increasing frequency. The particular frequency at which this will occur depends, to a large extent, upon the rating of the unit. In the larger units (e.g. 330 microfarads at 6 volts), a dependance of capacitance on applied frequency will begin to occur at frequencies of less than 1 kilocycle whereas low capacitance units will normally not show this effect until frequencies of several kilocycles are attained.

It is therefore, an object of the present invention to provide a capacitor adapted to have improved alternating current characteristics over a range of operating frequencies and operating temperatures.

Still another object of the present invention is to provide a tantalum capacitor having improved alternating current characteristics in the audio frequency range.

Still another object of the present invention is to provide an anode for use in a tantalum capacitor of particular geometrical shape adapted for use over a desired frequency range, the anode improving the alternating current characteristics of the tantalum capacitor.

Another object of the present invention is to provide a new type of tantalum capacitor embodying the constructional features of an improved anode exhibiting greatly improved alternating current characteristics.

Yet another object of the present invention is to provide a tantalum capacitor with an improved dissipation factor over a wide range of frequencies and over a wide range of temperatures.

Still another object of the present invention is to provide a tantalum capacitor with unique anode design with improved electrical characteristics.

The invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying figures of the drawing wherein like reference characters describe elements of similar function and wherein the scope of the invention is determined from the appended claims.

For illustrative purposes the invention will be described in conjunction with the accompanying drawings in which.

Figure 1A:
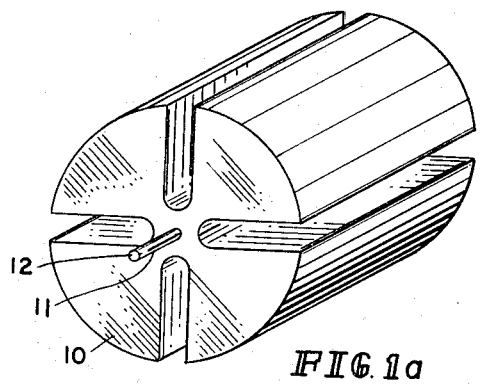
FIGURES 1a to 1h are perspective views of various tantalum anodes according to this invention.

Generally speaking, the present invention describes a novel anode for a tantalum capacitor which permits the construction of a capacitor having superior electrical characteristics when said capacitor is used in the audio frequency range and used at various temperatures. The anode of the present invention is a porous matrix of tantalum having a dielectric film formed thereon. Said anode is designed in such a manner as to reduced to a minimum the distance between any point within the anode and an external surface where contact to the electrolyte may be provided. In this way the effects of electrolyte resistance within the anode are minimized, resulting in an improved dissipation factor and a greater stability of capacitance over a wide range of frequencies and of temperatures.

In order that a systematic scientific approach may be taken in the design of solid tantalum capacitors with improved characteristics over a wide range of frequencies and temperatures, it will be necessary to discuss very briefly the theory underlying the effect of anode design on capacitor characteristics.

The overall dissipation factor of a solid tantalum capacitor comprises two main components. One component of the dissipation factor arises from losses which occur in the dielectric and the other component of the dissipation factor is due to ohmic resistance which is always present in a real capacitor. This ohmic resistance in turn, may be considered as being made up of two parts; (a) the resistance which is outside the porous sintered anode (lead, solder, carbon contact, etc.) and (b) the resistance of the $MnO_2$ within the porous anode. The dielectric contribution to the dissipation factor in modern good quality capacitors is usually less than 2% at 25° C. and it is relatively independent of the frequency in the range from 100 c.p.s. to 10 kc. The resistance contribution which makes up the remainder of the dissipation factor is, on the other hand, frequency dependent. Of the two factors from which it is constituted (viz. resistance outside and resistance inside the sintered anode), the resistance within the sintered anode is by far the more significant. This contribution to the dissipation factor is, in general, proportional to the square of a cross-sectional dimension of the anode. For a cylindrical anode, it can be shown that the contribution from this source to the dissipation factor is $\frac{1}{4}\pi f \rho \gamma r^2$ where $f$ is the frequency, $\rho$ is the $MnO_2$ resistivity, $\gamma$ the capacitance per unit volume and $r$ is the radius of the anode. Similar expressions have been derived for anodes of other simple geometries and in all instances we find that the expression for the dissipation factor contains a term in "distance" squared. In all cases this distance corresponds to the distance from the external contact to the most remote point within the body of the porous anode (e.g. the radius in the case of a solid cylinder). Since $\gamma$ cannot be varied to any appreciable extent without increasing the volume of the capacitor, this latter resistive component of the dissipation factor can be reduced by reducing the electrolyte resistivity $\rho$, and/or by reducing the distance between the external contact and the most remote points within the anode. This latter factor holds the most promise for reducing the dissipation factor of solid tantalum capacitors since it appears in the expression as a term "squared." An almost limitless number of anode geometries or modifications thereof are possible for achieving this result. A few representative geometries are illustrated in FIGURES 1a to 1h.

Referring to FIGURES 1a to 1h of the drawings which illustrate embodiments of the present invention, there is shown an anode 10 which is fabricated of tantalum, preferably of porous tantalum metal formed of tantalum particles pressed and sintered by powered metallurgical procedures. The tantalum slug so fabricated is adapted to be used as an anode having an unusually great surface area. Anode 10 has coupled thereto a stem or rod 11 which may be fabricated of tantalum and may be integrally formed therewith. A tip 12 of rod 11 is adapted as an electrode terminal in the operation of the anode.

Another benefit to be derived from reducing the cross-section of the anode is an increased stability of capacitance. The capacitance of a tantalum capacitor will, in general, be a function of both frequency and of temperature. As in the case of the dissipation factor, capacitance variations may arise for two different reasons. The first is a property of the dielectric and will not be discussed here. It will suffice to say in this regard that the properties of $Ta_2O_5$ used in tantalum capacitors are such that the capacitance will vary with frequency to the extend of about 1% per decade and with temperature by about 3% from +25 degrees C. to −55 degrees C. The second cause of capacitance variations result from the distributed arrangement of capacitance and resistance within the body of the sintered anode. A detailed analysis of the problem shows that the apparent capacitance from a cylindrical porous anode is given by the following expression:

$$\frac{C_0}{C} = \frac{2}{\sqrt{\alpha}} \frac{M_i(\sqrt{\alpha})}{M_o(\sqrt{\alpha})} \cos C_0 C \{\theta_0(\sqrt{\alpha}) - \theta_1(\sqrt{\alpha}) + \tfrac{1}{4}\pi\}$$

where $C$ is the capacitance in any given frequencies and $C_0$ is the capacitance at the low frequency. $M_i$, $M_o$, $\theta_0$, and $\theta_1$ are functions of the Bessel type and $\alpha = r^2 2\pi f \gamma \rho$ in which $f$ is frequency, $\rho$ is electrolyte resistivity and $\gamma$ is capacitance per unit volume $r$ is the radius of the anode.

Figure 5:
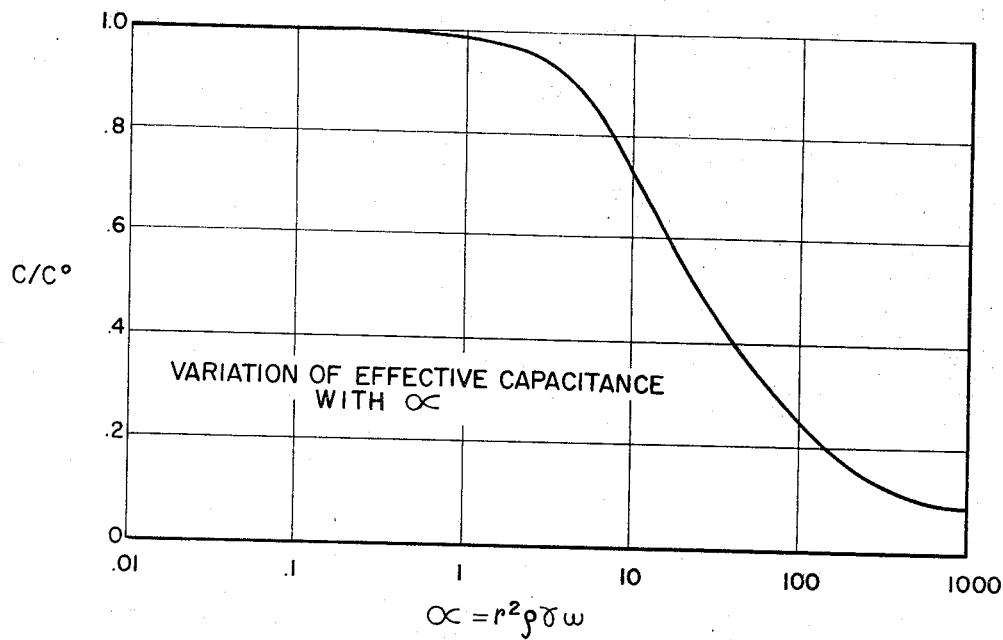
FIGURE 5 is a graph illustrating the variation of effective capacitance with $\alpha$, where $\alpha$ is a dimension less parameter related to the geometry of the anode and proportional to the capacitance per unit volume, the electrolyte resistivity, and the measuring frequency.
Figure 6:
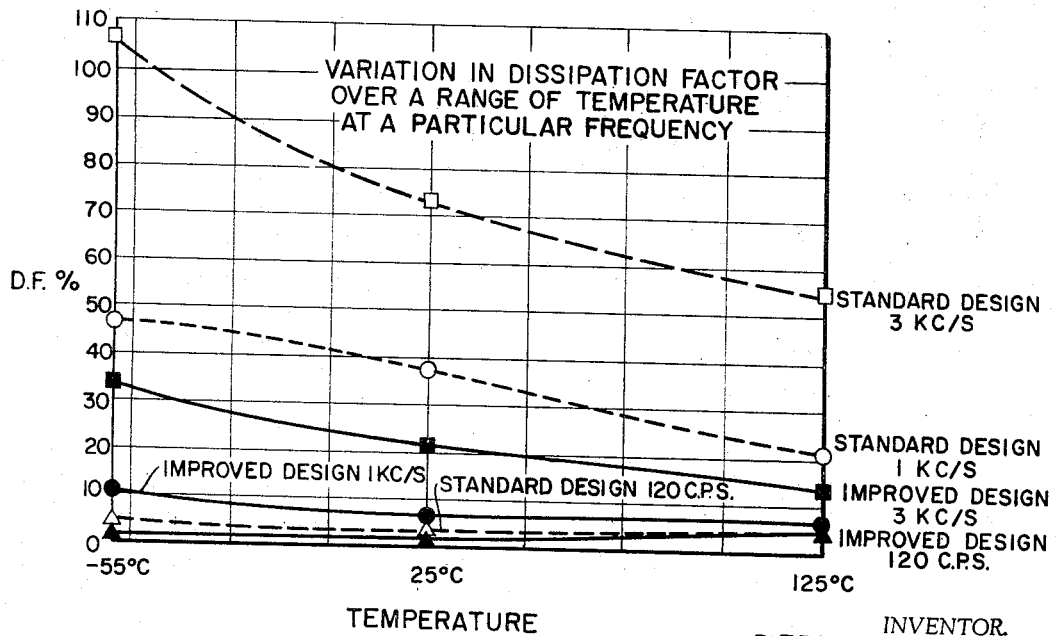
FIGURE 6 is a graph showing the variation in dissipation factor over a range of temperature at a particular frequency.

A plot of this function is shown in FIGURE 5. It can be seen from this figure that for values of $\alpha$ greater than one the capacitance is dependent upon $\alpha$. From the definition of $\alpha$ it follows that in the region where $\alpha$ is greater than one the capacitance is a function of frequency and also it is a function of electrolyte resistivity $\rho$. Since $\rho$ is a function of temperature, it follows further that capacitance will also be a function of temperature. If the other variables are made small, particularly $\alpha$ can be made to remain less than one in which case the capacitance will be independent of small variations in $\alpha$ and consequently independent of both frequency and temperature. However, as indicated previously, in a real capacitor some dependence of capacitance and temperature will remain due to purely dielectric effects. These are the dielectric losses referred to previously. However, this dependence on temperature from dielectric effects is small compared to the effects arising from the distributed nature of the capacitor discussed hereinbefore. Among the anode designs which are suitable for manufacture of capacitors having superior "high frequency" characteristics the hollow anode of FIGURE 1b appears to be the most advantageous. It has the advantages of simplicity of construction and relatively high volume efficiency.

Figure 1B:
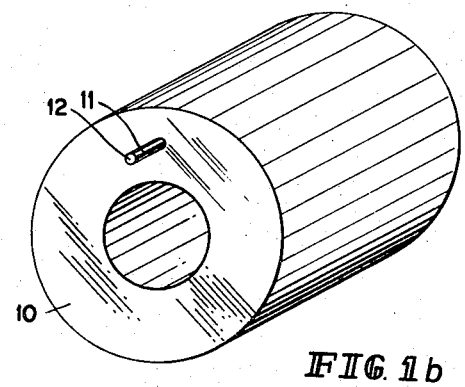
Figure 1C:
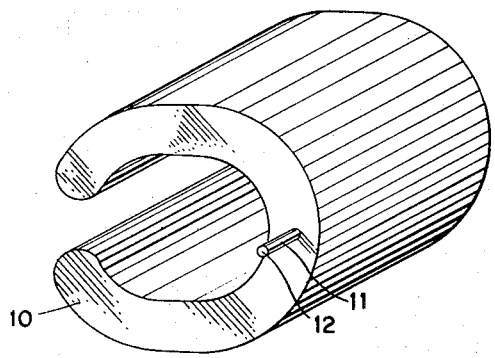
Figure 1D:
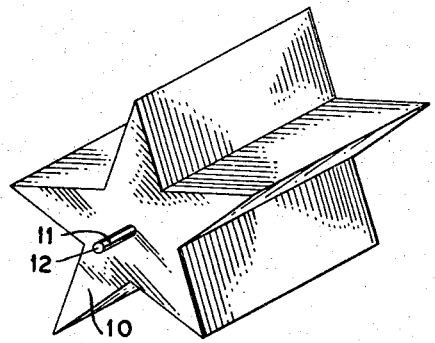
Figure 1E:
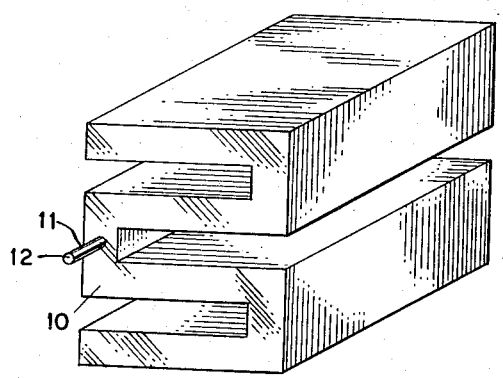
Figure 1F:
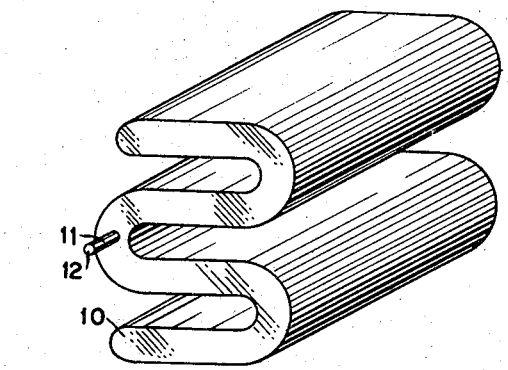
Figure 1G:
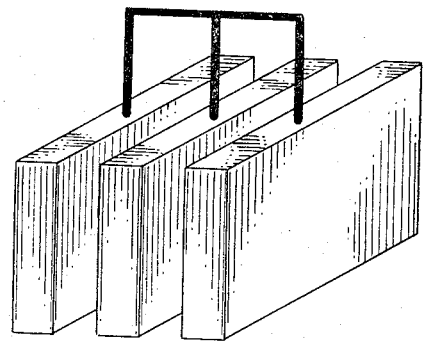
Figure 1H:
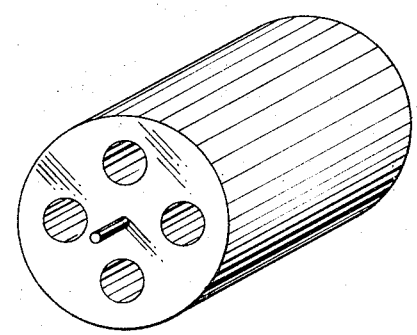
Figure 2:
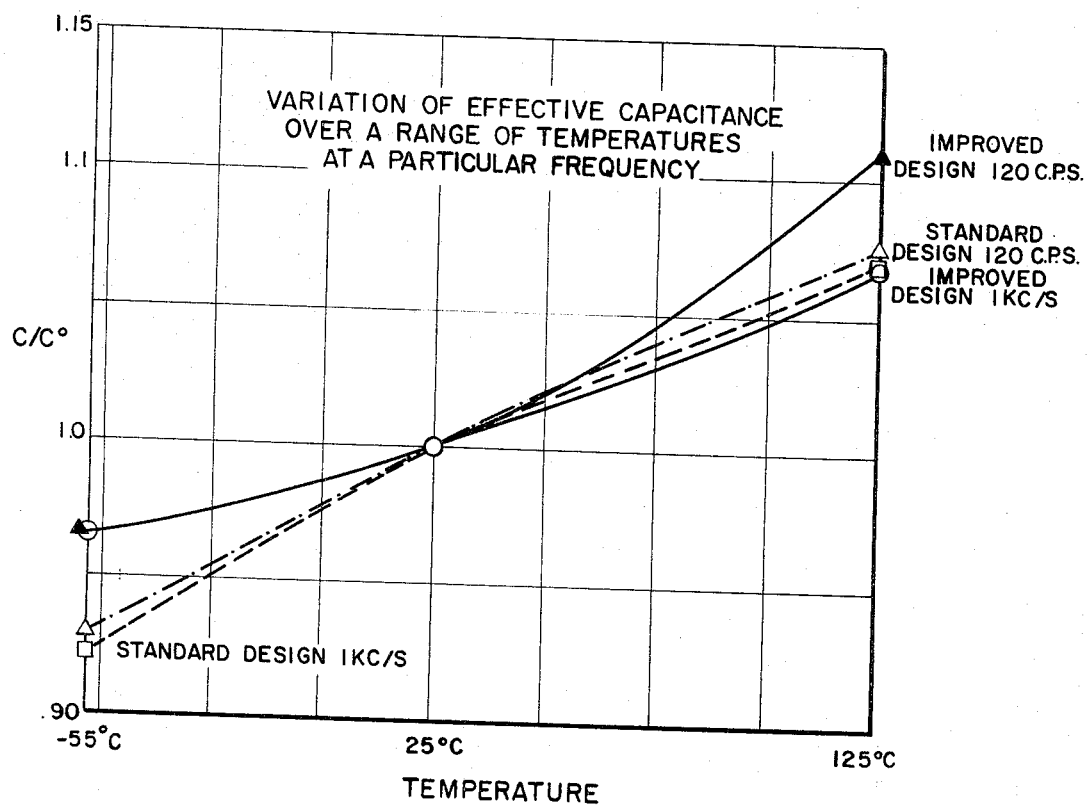
FIGURE 2 is a graph illustrating the variation of effective capacitance over a range of temperatures at a particular frequency.
Figure 3:
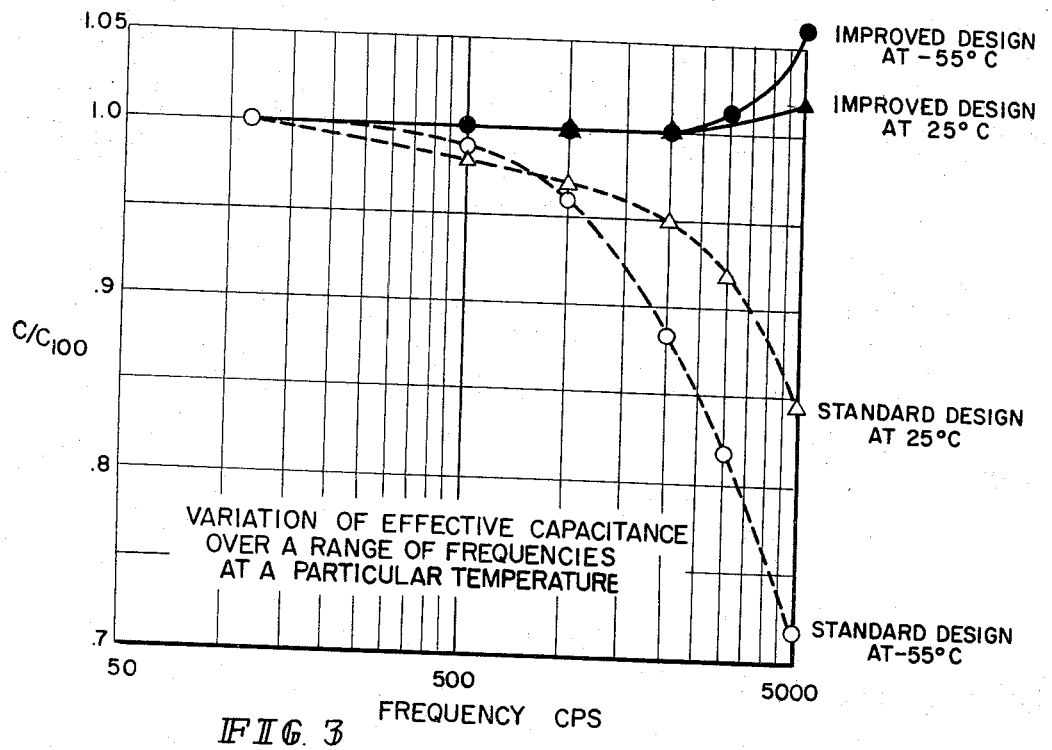
FIGURE 3 is a graph showing the variation of effective capacitance over a range of frequencies at a particular temperature.
Figure 4:
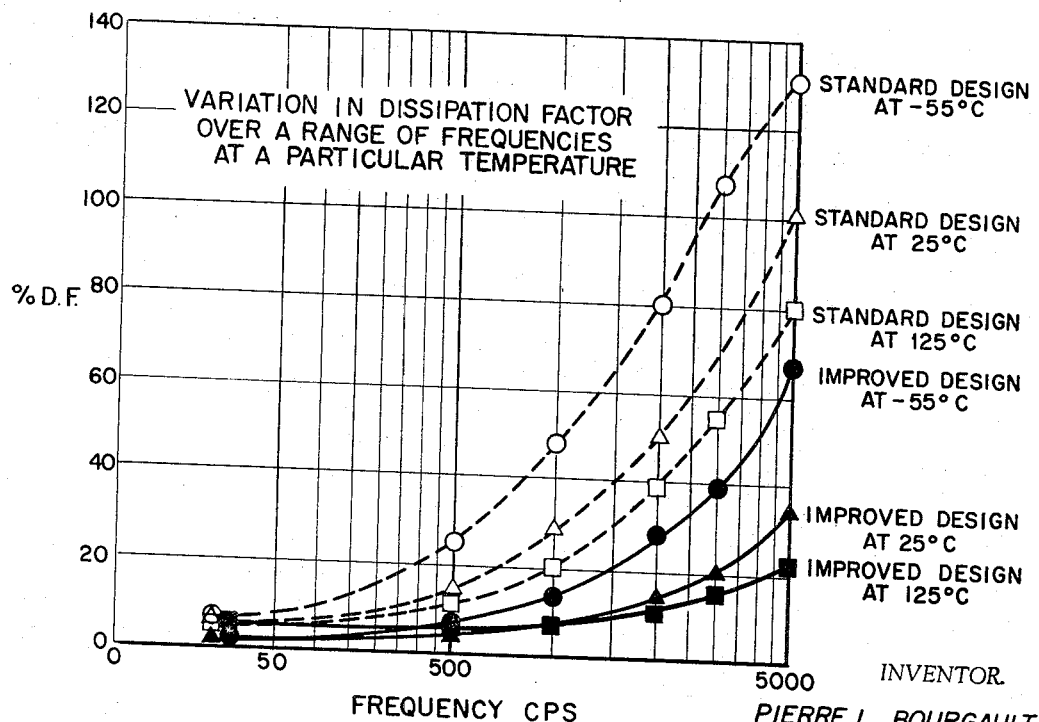
FIGURE 4 is a graph showing the variation in dissipation factor over a range of frequencies at a particular temperature.

Sixteen tantalum capacitors were constructed using the hollow cylinder design of FIGURE 1b. The fabrication process was that which is normally used in the manufacture of solid, or slug type tantalum capacitors. These tantalum capacitors had a nominal capacitance rating of 330 microfarads. The alternating current characteristics of these aforementioned capacitors are given in Table I and Table II. In the tables the symbols "Cap." represents capacitance and the symbol "D.F." represents dissipation factor.

TABLE I

[Alternating current characteristics of improved design solid tantalum capacitors at 25° centigrade]

| Capacitor Identification No. | 120 c.p.s. | | 1,000 c.p.s. | | 3,000 c.p.s. | |
|---|---|---|---|---|---|---|
| | Cap. | D.F. | Cap. | D.F. | Cap. | D.F. |
| 1 | 316 | .020 | 313 | .087 | 315 | .237 |
| 2 | 326 | .017 | 320 | .076 | 326 | .219 |
| 3 | 326 | .017 | 324 | .064 | 328 | .189 |
| 4 | 319 | .018 | 316 | .067 | 321 | .183 |
| 5 | 320 | .014 | 317 | .062 | 325 | .177 |
| 6 | 319 | .017 | 328 | .084 | 331 | .243 |
| 7 | 331 | .023 | 326 | .102 | 328 | .282 |
| 8 | 326 | .022 | 321 | .103 | 326 | .294 |
| 9 | 327 | .016 | 325 | .067 | 328 | .201 |
| 10 | 324 | .022 | 318 | .088 | 324 | .249 |
| 11 | 326 | .017 | 321 | .085 | 327 | .243 |
| 12 | 328 | .019 | 326 | .077 | 328 | .216 |
| 13 | 306 | .026 | 301 | .078 | 303 | .184 |
| 14 | 333 | .016 | 329 | .071 | 333 | .172 |
| 15 | 316 | .018 | 313 | .066 | 316 | .172 |
| 16 | 302 | .017 | 298 | .061 | 300 | .162 |
| Typical Standard Unit | 329 | .041 | 319 | .275 | 301 | .726 |

TABLE II
[Alternating current characteristics of improved design solid tantalum capacitors at −55° centigrade]

| Capacitor Identification No. | 120 c.p.s. | | 1,000 c.p.s. | | 3,000 c.p.s. | |
|---|---|---|---|---|---|---|
| | Cap. | D.F. | Cap. | D.F. | Cap. | D.F. |
| 4 | 309 | .018 | 308 | .121 | 315 | .357 |
| 9 | 316 | .018 | 316 | .133 | 320 | .397 |
| 16 | 290 | .017 | 288 | .094 | 290 | .184 |
| Standard Unit | 306 | .057 | 294 | .475 | 251 | 1.07 |

Characteristics at +125° C.

| | | | | | | |
|---|---|---|---|---|---|---|
| 4 | 366 | .050 | 348 | .069 | 349 | .144 |
| 9 | 364 | .054 | 349 | .063 | 356 | .139 |
| 16 | 364 | .060 | 336 | .079 | 334 | .134 |
| Standard Unit | 354 | .043 | 341 | .208 | 336 | .554 |

FIGURES 2–6 give the data to Tables I and II in pictorial form. These figures also illustrate pictorially the representative values for conventionally designed capacitors operating under substantially the same environmental conditions. For convenience, all test data listed for tantalum capacitors of standard design is shown in broken lines whereas all test data of the improved design is illustrated by a solid line. It is seen that not only was there a distinct improvement of the dissipation factor of the new design, but there was also a distinct improvement in the capacitance of the improved design as compared to the capacitor of the standard design.

Although the present invention has been disclosed in connection with preferred embodiments, variations and modifications may be resorted to by those skilled in the art without departing from the scope of the novel concepts of this invention and as set forth in the appended claims.

Having thus described our invention, we claim:

1. An electrolytic capacitor comprising a solid porous anode of film forming metal characterized by a multiplicity of microscopic intercommunicating voids having a dielectric film formed thereof and being permeated by at least one channel reducing the quantity of metal in said anode, a first electrode for said anode, a solid electrolyte in said voids and in contact with said film, a second electrode in the form of a conducting layer on the exterior surfaces of said electrolyte including said channels and in contact with said electrolyte, and said channeled anode comprising means for reducing the electrical impedance thereof, at least at a single frequency, in the mean path between any point within the anode and the exterior surface of the conducting layer, to a value below the value of the impedance from said point to said surface in the anode with said channels filled with the unremoved mass of film-forming metal.

2. An electrolytic capacitor comprising a solid porous anode of film forming metal characterized by a multiplicity of microscopic intercommunicating voids having a dielectric film formed thereon and being permeated by a plurality of channels reducing the quantity of metal in said anode, a first electrode for said anode, a semiconductor electrolyte in said voids and in contact with said film, a second electrode in the form of a conducting layer on the exterior surfaces of said electrolyte including said channels and in contact with said electrolyte, and said channeled anode comprising means for reducing the electrical impedance thereof, at least at a single frequency, in the mean path between any point within the anode and the exterior surface of the conducting layer, to a value below the value of the impedance from said point to said surface in the anode with said channels filled with the unremoved mass of film-forming metal.

3. An electrolytic capacitor comprising a solid porous cylindrical-shaped anode of film forming metal characterized by a multiplicity of microscopic intercommunicating voids having a dielectric film formed thereon and being permeated by a plurality of radial channels extending the length thereof reducing the quantity of metal in said anode, an axial first electrode connected to said anode, semiconductor electrolyte in said voids and in contact with said film, a second electrode in the form of a conducting layer on the exterior surfaces of said electroyte including said channels and in contact with said electrolyte, and said channeled anode comprising means for reducing the electrical impedance thereof, at least at a single frequency, in the mean path between any point within the anode and the exterior surface of the conducting layer, to a value below the value of the impedance from said point to said surface in the anode with said channels filled with the unremoved mass of film-forming metal.

4. An electrolytic capacitor comprising a solid porous anode of film forming metal characterized by a multiplicity of microscopic intercommunicating voids having a dielectric film formed thereon and being permeated by a plurality of spaced parallel channels reducing the quantity of metal in said anode, successive ones of said channels extending to the opposite periphery of said anode, a first electrode for said anode, a manganese dioxide electrolyte in said voids and in contact with said film, a second electrode in the form of a conducting layer on the exterior surfaces of said electrolyte including said channels and in contact with said electrolyte, and said channeled anode comprising means for reducing the electrical impedance thereof, at least at a single frequency, in the mean path between any point within the anode and the exterior surface of the conducting layer, to a value below the value of the impedance from said point to said surface in the anode with said channels filled with the unremoved mass of film-forming metal.

5. An electrolytic capacitor comprising a solid porous cylindrical anode of film forming metal characterized by a multiplicity of microscopic intercommunicating voids having a dielectric film formed thereon and being permeated by an axial channel extending the length of said anode reducing the quantity of metal in said anode, a first electrode for said anode, a manganese dioxide electrolyte in said voids and in contact with said film, a second electrode in the form of a conducting layer on the exterior surfaces of said electrolyte including said channel and in contact with said electrolyte, and said channeled anode comprising means for reducing the electrical impedance thereof, at least at a single frequency, in the mean path between any point within the anode and the exterior surface of the conducting layer, to a value below the value of the impedance from said point to said surface in the anode with said channels filled with the unremoved mass of film-forming metal.

6. An electrolytic capacitor comprising a solid porous anode of film forming metal characterized by a multiplicity of microscopic intercommunicating voids having a dielectric film formed thereon and being permeated by a substantially U-shaped channel extending the length of said anode reducing the quantity of metal in said anode, a first electrode for said anode, a manganese dioxide electrolyte in said voids and in contact with said film, a second electrode in the form of a conducting layer on the exterior surfaces of said electrolyte including said channel and in contact with said electrolyte, and said channeled anode comprising means for reducing the electrical impedance thereof, at least at a single frequency, in the mean path between any point within the anode and the exterior surface of the conducting layer, to a value below the value of the impedance from said point to said surface in the anode with said channels filled with the unremoved mass of film-forming metal.

7. An electrolytic capacitor comprising a solid porous anode of film forming metal characterized by a multiplicity of microscopic intercommunicating voids having a dielectric film formed thereon and being permeated by a plurality of peripheral triangular-shaped channels extending the length of said anode reducing the quantity of metal in said anode, a first electrode for said anode, a manganese dioxide electrolyte in said voids and in contact with said film, a second electrode in the form of a conducting layer on the exterior surfaces of said electrolyte including said channels and in contact with said electrolyte, and said channeled anode comprising means for reducing the electrical impedance thereof, at least at a single frequency, in the mean path between any point within the anode and the exterior surface of the conducting layer, to a value below the value of the impedance from said point to said surface in the anode with said channels filled with the unremoved mass of film-forming metal.

8. An electrolytic capacitor comprising a solid porous anode of film forming metal characterized by a multiplicity of intercommunicating voids having a dielectric film formed thereon, a solid electrolyte in said voids and in contact with said film, a terminal layer on the exterior surfaces of said anode in contact with said electrolyte, said anode having a geometric configuration characterized by a solid shape with portions thereof removed, and said anode comprising means for reducing the electrical impedance thereof, at least at a single frequency, in the mean path between any point within the anode and the exterior surface of the terminal layer, to a value below the value of the impedance from said point to said surface in the anode with said portions filled with the unremoved mass of film-forming metal.

9. An electrolytic capacitor comprising a solid porous anode of film forming metal characterized by a multiplicity of intercommunicating voids having a dielectric film formed thereon, a first terminal connected to said anode, a semi-conductor electrolyte in said voids and in contact with said film, a terminal layer on the exterior surfaces of said anode in contact with said electrolyte, said anode having a geometric configuration characterized by a solid shape with portions thereof removed, and said anode comprising means for reducing the electrical impedance thereof, at least at a single frequency, in the mean path between any point within the anode and the exterior surface of the terminal layer, to a value below the value of the impedance from said point to said surface in the anode with said portions filled with the unremoved mass of film-forming metal.

10. An electrolytic capacitor comprising a solid porous anode of film forming metal characterized by a multiplicity of intercommunicating voids having a dielectric film formed thereon, a first terminal connected to said anode, a manganese dioxide electrolyte in said voids and in contact with said film, a terminal layer on the exterior surfaces of said anode in contact with said electrolyte, said anode having a geometric configuration characterized by a solid shape with portions thereof removed, and said anode comprising means for reducing the electrical impedance thereof, at least at a single frequency, in the mean path between any point within the anode and the exterior surface of the terminal layer, to a value below the value of the impedance from said point to said surface in the anode with said portions filled with the unremoved mass of film-forming metal.

References Cited
UNITED STATES PATENTS

| | | | |
|---|---|---|---|
| 1,936,084 | 11/1933 | Edwards | 317—230 |
| 2,042,283 | 5/1936 | Van Arkel et al. | 317—230 |
| 2,283,723 | 5/1942 | Clark | 317—230 |
| 2,299,228 | 10/1942 | Gray et al. | 317—230 |
| 3,115,596 | 12/1963 | Fritsch | 317—230 |
| 3,196,323 | 7/1965 | Rogers et al. | 317—230 |
| 3,286,136 | 11/1966 | McLean | 317—230 |

JAMES D. KALLAM, *Primary Examiner.*